United States Patent
Fong et al.

(10) Patent No.: US 9,471,682 B1
(45) Date of Patent: Oct. 18, 2016

(54) PROVIDING INFORMATION ASSOCIATED WITH A PROFILE OWNER IN A SOCIAL NETWORK SYSTEM

(75) Inventors: Bryant Fong, Kirkland, WA (US); Kobi Reiter, Seattle, WA (US); Nashant Atul Thakkar, Seattle, WA (US); Sean Edward Purcell, San Francisco, CA (US); Corinna Hinke, San Francisco, CA (US)

(73) Assignee: Google Inc., Mountain View, CA (US)

( * ) Notice: Subject to any disclaimer, the term of this patent is extended or adjusted under 35 U.S.C. 154(b) by 388 days.

(21) Appl. No.: 13/597,112

(22) Filed: Aug. 28, 2012

(51) Int. Cl.
*G06F 17/30* (2006.01)

(52) U.S. Cl.
CPC .............................. *G06F 17/30864* (2013.01)

(58) Field of Classification Search
CPC ................................................ G06F 17/30864
USPC ................ 707/791, 802–805, 809, 999.102; 709/204–207; 370/259
See application file for complete search history.

(56) References Cited

U.S. PATENT DOCUMENTS

| | | | |
|---|---|---|---|
| 2009/0157513 A1* | 6/2009 | Bonev et al. | 705/14 |
| 2010/0198854 A1* | 8/2010 | Chitturi | G06F 17/30864 707/760 |
| 2012/0158744 A1* | 6/2012 | Tseng et al. | 707/748 |

* cited by examiner

*Primary Examiner* — Syling Yen
(74) *Attorney, Agent, or Firm* — IP Spring

(57) ABSTRACT

Implementations generally relate to providing information associated with a profile owner to a target user in a social network system. In one implementation, a method includes receiving profile data associated with a profile owner. The method also includes receiving contact data associated with the profile owner, where the profile data and the contact data are provided by different users. The method also includes generating one or more views, where the one or more views include an interleaved view, and where the profile data and the contact data are displayed in an interleaved manner in a same section of the interleaved view.

20 Claims, 5 Drawing Sheets

400

PROVIDING INFORMATION ASSOCIATED WITH A PROFILE OWNER IN A SOCIAL NETWORK SYSTEM

BACKGROUND

A social network system maintains profile information associated with users of the social network system. Profile information may include a user's name, and phone number or email address, for example. When a user initially opens an account, the social network system prompts the user to provide profile information such as a user name and email address, phone number, location, employer, title, etc. The social network system may enable the user, also referred to as the profile owner, to share the profile information with other users of the social network system. For example, the social network system may display the profile information to other users of the social network system when the other users navigate to the profile owner's profile page.

SUMMARY

Implementations relate generally to social network systems, and more particularly to providing information associated with a profile owner to a target user in a social network system. In some implementations, a method includes receiving profile data associated with a profile owner, where the profile data is owned by the receiving profile data associated with a profile owner. The method also includes receiving contact data associated with the profile owner, where the profile data and the contact data are provided by different users. The method also includes generating one or more views, where the one or more views include an interleaved view, and where the profile data and the contact data are displayed in an interleaved manner in a same section of the interleaved view.

With further regard to this method, in some implementations, the contact data is provided by a target user. In some implementations, the method further includes enabling the target user to modify the contact data in any one of the one or more views. In some implementations, the method further includes updating the contact data in each of the one or more views in response to the target user modifying the contact data. In some implementations, the method further includes generating a separated view, where the profile data and the contact data are displayed in different sections of the separated view. In some implementations, the method further includes generating a separated view, wherein the profile data and the contact data are displayed in different sections of the separated view; generating the interleaved view; and selectively omitting profile data from the interleaved view based on data field type. In some implementations, the method further includes generating a separated view, wherein the profile data and the contact data are displayed in different sections of the separated view; generating the interleaved view; and merging duplicate data from the profile data and the contact data in the interleaved view. In some implementations, the method further includes causing attribution information to be displayed in the interleaved view, and wherein the attribution information indicates sources of the profile data and the contact data.

In some implementations, a method includes receiving profile data associated with a profile owner. The method further includes receiving contact data associated with the profile owner. The method further includes generating a first view and a second view, where the profile data and the contact data are displayed in different sections of the first view, and where the profile data and the contact data are displayed in a same section of the second view.

With further regard to this method, in some implementations, the method includes enabling a target user to modify the contact data in any one of the first and second views. In some implementations, the method includes updating the contact data in each of the first and second views in response to the target user modifying the contact data. In some implementations, the method includes causing the profile data and the contact data to be interleaved in the second view. In some implementations, the method includes merging duplicate data from the profile data and the contact data in the second view. In some implementations, the method includes causing the profile data and the contact data to be interleaved in the second view, and causing attribution information to be displayed in the second view, where the attribution information indicates sources of the profile data and the contact data.

In some implementations, a system includes one or more processors, and logic encoded in one or more tangible media for execution by the one or more processors. When executed, the logic is operable to perform operations including receiving profile data associated with a profile owner; receiving contact data associated with the profile owner, where the profile data and the contact data are provided by different users; and generating one or more views, where the one or more views includes an interleaved view, and where the profile data and the contact data are displayed in an interleaved manner in a same section of the interleaved view.

With further regard to the system, in some implementations, the contact data is provided by a target user. In some implementations, the logic when executed is further operable to perform operations including enabling the target user to modify the contact data in any one of the one or more views. In some implementations, the logic when executed is further operable to perform operations including updating the contact data in each of the one or more views in response to the target user modifying the contact data. In some implementations, the logic when executed is further operable to perform operations including generating a separated view, where the profile data and the contact data are displayed in different sections of the separated view. In some implementations, the logic when executed is further operable to perform operations including generating a separated view, wherein the profile data and the contact data are displayed in different sections of the separated view; generating the interleaved view; and selectively omitting profile data from the interleaved view based on data field type. In some implementations, the logic when executed is further operable to perform operations including generating a separated view, wherein the profile data and the contact data are displayed in different sections of the separated view; generating the interleaved view; and merging duplicate data from the profile data and the contact data in the interleaved view. In some implementations, the logic when executed is further operable to perform operations including causing attribution information to be displayed in the interleaved view, and wherein the attribution information indicates sources of the profile data and the contact data.

Some implementations may provide various advantages. For example, implementations may provide a target user with different views for viewing profile data and contact data. Implementations may provide the target user with attribution information that indicates the source of data in particular fields of an interleaved view.

DETAILED DESCRIPTION

Implementations described herein provide information associated with a profile owner to a target user in a social network system. In some implementations, a system receives profile data associated with the profile owner. Such profile data may include, for example, name, location, phone number, email addresses, etc. The profile data is owned by the profile owner (e.g., Robert S.) in that the profile owner initially provides the profile data to the social network system, and the profile owner has permission to add, modify, and remove profile data.

The system also receives contact data associated with the profile owner (e.g., Robert S.). Such contact data is entered by the target user (e.g., Tim U.), and the contact data may include, for example, name, location, phone number, email addresses, etc. While the contact data is associated with the profile owner (e.g., profile owner's name, phone number, etc.), the contact data is owned by the target user in that the target user initially provides the contact data to the social network system, and the target user has permission to add, modify, and remove contact data.

The system generates multiple views for displaying the profile data and contact data to the target user (e.g., Tim U.). Each view displays the profile data and the contact data associated with the profile owner. For example, one view may display the profile data and the contact data in separate sections. Another view may display the profile data and the contact data interleaved in the same section. The system enables the target user to toggle between the different views. The system also enables the target user to add, modify, and remove contact data in any of the views.

Methods and systems are described herein are associated with particular implementations. However, these methods and systems will operate effectively in various implementations.

Figure 1:
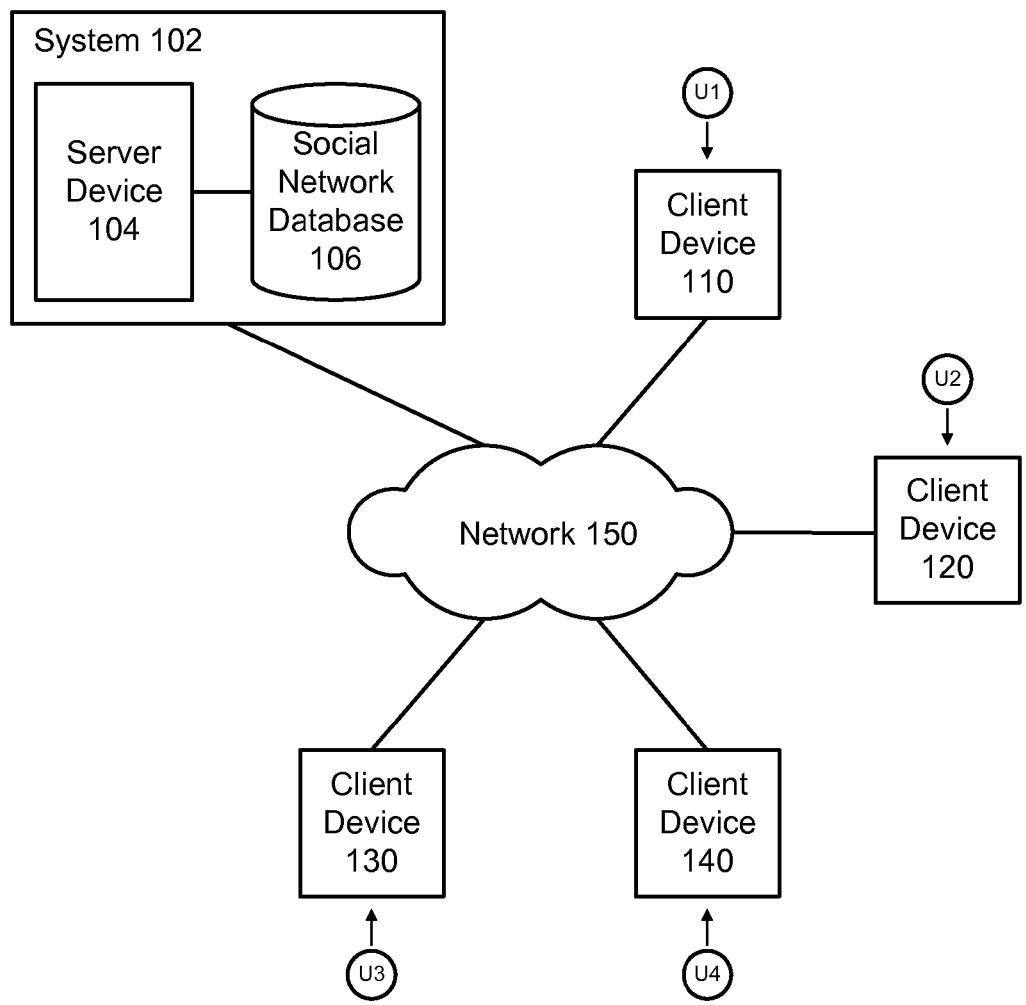
FIG. 1 illustrates a block diagram of an example network environment, which may be used in implementations described herein.

FIG. 1 illustrates a block diagram of an example network environment 100, which may be used in implementations described herein. In some implementations, network environment 100 includes a system 102, which includes a server device 104 and a social network database 106. The term system 102 and phrase "social network system" may be used interchangeably. Network environment 100 also includes client devices 110, 120, 130, and 140, which may communicate with each other via system 102 and a network 150.

For ease of illustration, FIG. 1 shows one block for each of system 102, server device 104, and social network database 106, and shows four blocks for client devices 110, 120, 130, and 140. Blocks 102, 104, and 106 may represent multiple systems, server devices, and social network databases. Also, there may be any number of client devices. In some implementations, network environment 100 may not have all of the components shown and/or may have other elements including other types of elements instead of, or in addition to, those shown herein. In various implementations, users U1, U2, U3, and U4 may communicate with each other using respective client devices 110, 120, 130, and 140.

Figure 2:
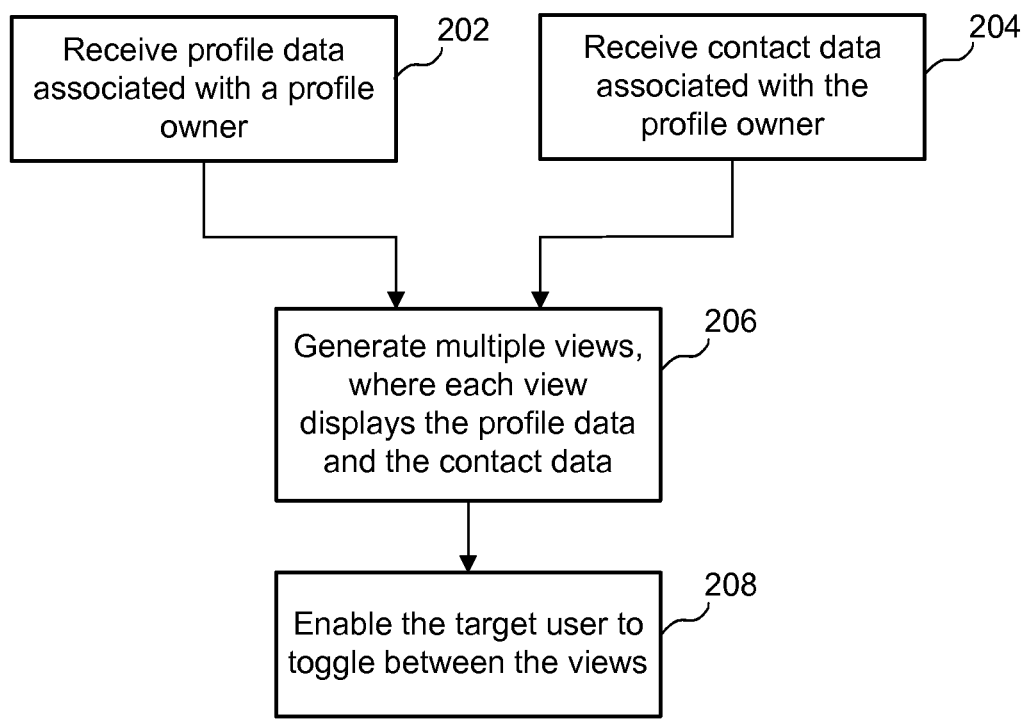
FIG. 2 illustrates an example simplified flow diagram for providing information associated with a profile owner, according to some implementations.

FIG. 2 illustrates an example simplified flow diagram for providing information associated with a profile owner to a target user in a social network system, according to some implementations. Referring to both FIGS. 1 and 2, a method is initiated in blocks 202 and 204. In block 202, system 102 receives profile data associated with a profile owner. In block 204, system 102 receives contact data associated with the profile owner. In various implementations, system 102 may perform the steps of blocks 202 and 204 substantially simultaneously or in any order. The specific order of operations will depend on the particular implementations. For example, in some implementations, system 102 may perform the step of block 202 before performing the step of 204. In some implementations, system 102 may perform the step of block 204 before performing the step of 202.

With regard to block 202, the profile data may include, for example, photo, name, location, phone numbers, email addresses, etc. In some implementations, the profile data is owned by the profile owner in that the profile owner initially provides the profile data to the social network system. For example, when the profile owner initially establishes an account in the social network system, system 102 may prompt the profile owner to provide certain information such as a name (e.g., first name, last name, etc.) and email address. System 102 gives the profile owner permission to add, modify, and remove profile data. For example, the profile owner may add additional information such as alternative phone numbers with labels (e.g., cell phone number, work number, home number, etc.), alternative email addresses with labels (e.g., personal email address, work email address, etc.), location (e.g., city, country, etc.), physical address and labels (e.g., work address, home address, etc.). These are examples of profile data and other types of profile data are possible (e.g., employer, title, etc.).

With regard to block 204, the contact data is entered by the target user, and the contact data may include, for example, photo, name, location, phone numbers, email addresses, etc. of the profile owner. While the contact data is associated with the profile owner (e.g., profile owner's name, phone number, etc.), the contact data is owned by the target user in that the target user initially provides the contact data to the social network system.

In some implementations, the profile data may be retrieved from one storage location, while the contact data may be retrieved from another storage location. Alternatively, the profile data and the contact data may be stored in the same storage location. In some implementations, system 102 may retrieve data from all sources (e.g., two different storage locations), merge the data, and then separate the data into different fields as needed, depending on the particular view.

The profile data and contact data may include the same data or at least overlapping data, because the profile data and contact data are associated with the same person (e.g., Robert S.). The profile data and contact data, however, may have differences, because the profile data and contact data have been entered by two different people, the profile owner (e.g., Robert S.) and the target user (e.g., Tim U.). For example, it is possible that either and/or both the profile data and the contact data have new data (e.g., new work phone number), incorrect data, or outdated data (e.g., old location).

For clarity and ease of illustration, the phrases "profile data" and "contact data" are distinct, even though the data may be the same, in order to show different attribution. As used herein, the term "attribution" encompasses its plain and ordinary meaning, including but not limited to indicating the source and ownership of the data.

In block 206, system 102 generates one or more views for displaying the profile data and contact data to the target user, where each view displays both the profile data and the contact data associated with the profile owner. For example, in some implementations, when generating multiple views, system 102 may generate a first view, where the profile data and the contact data are displayed in different sections of the first view. In some implementations, when generating multiple views, system 102 may generate a second view, where the profile data and the contact data are displayed in a same section of the second view. Examples of the multiple views are described in more detail below in connection with FIGS. 3 and 4.

In block 208, system 102 enables the target user to toggle between the views. As described in more detail below, each view has different advantages to the target user.

Respective to features described herein, system 102 enables the target user to access the views on the target user's respective client device. The views may be displayed using software on the client device, such as application software or client software in communication with system 102. The data shown in the views may be stored locally to the client device, and/or may be stored at system 102 and sent to a client device from system 102. The views are displayed on a display screen of the client device. The form includes multiple fields, where each field displays data of a particular type. In some implementations, the views may be displayed using a particular standardized format, such as in a web browser or other application as a web page provided in Hypertext Markup Language (HTML), Java™, Extensible Markup Language (XML), Extensible Stylesheet Language Transformation (XSLT), and/or other format.

For ease of illustration, some implementations are described herein in the context of a single profile associated with the profile owner. These same implementations and others may also apply to other contexts such as multiple profiles associated with the same profile owner. The same implementations may also apply to multiple profiles associated with the same contact, even when they do not belong to the same profile owner (e.g., members of the same family living at a single address).

For example, in some implementations, system 102 may combine multiple profiles for the same profile owner. In a scenario where the profile is associated with multiple profiles (e.g., a personal profile and a work profile), system 102 may provide a separated view where personal profile data, work profile data, and contact data are displayed in separate sections. System 102 may also provide an interleaved view, where personal profile data, work profile data, and contact data are displayed in an interleaved manner in the same section in the interleaved view. In some implementations, system 102 may provide a view that combines N contact records.

Some implementations may be applied to first-party and third-party services. For example, a given user may be associated with a profile on a first-party service, and the same user may be associated with a profile on a third-party service. In various implementations, each of the first-party and third-party services may be a social network service or a wiki. In various implementations, system 102 may provide a separated view that displays profile data and contact data from the first-party service in different sections, and that displays profile data and contact data from the third-party service in other sections. System 102 may provide an interleaved view that displays the profile data and contact data from the first-party service and the third-party service in the same interleaved section. In another example, a given user may be associated with a profile on one social network service (e.g., a first-party service), and the same user may be associated with a profile on another social network service (e.g., a third-party service). In various implementations, the profile on the third-party service may be owned by the profile owner or the third-party service.

In some implementations, the contact data may be owned by the target user. In some implementations, the contact data may be owned by a third user who has given view or edit access to the target user. In some implementations, system 102 may enable a user to share contacts with a spouse, family member, friend, etc. For example, a target user's wife shares her contacts with the target user. As such, the target user's view of the wife's father's profile may be a combination of: the father's profile, the wife's contact record for the father, and the target user's contact record for the father.)

Figure 3:
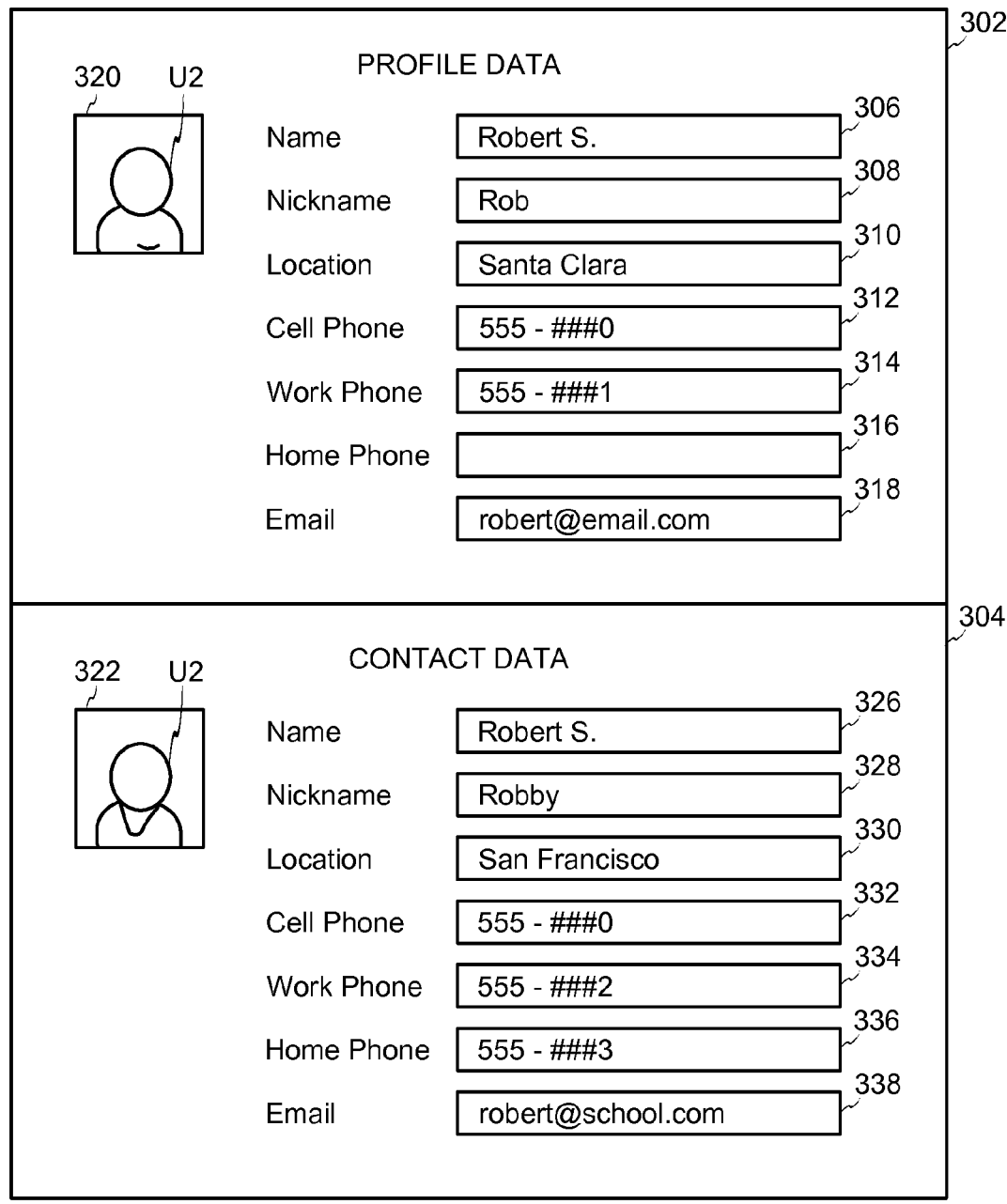
FIG. 3 illustrates an example simplified view in a graphical user interface (GUI), according to some implementations.

FIG. 3 illustrates an example simplified view 300 in a graphical user interface (GUI), according to some implementations. As shown, the view 300 includes a profile data section 302 and a contact data section 304. Profile data section 302 and contact data section 304 are separate from each other. In other words, system 102 may group the data by source (e.g., profile owner or target user). As shown, in some implementations, contact data section 304 may be displayed underneath profile data section 302. In some implementations, profile data section 302 may be displayed underneath contact data section 304. As such, view 300 also may be referred to as a separated view 300. In some implementations, in the separated view, system 102 may group profile data and contact data by source/attribution. For example, system 102 may group profile data together, because the profile owner is the source. System 102 may group contact data together, because the target user is the source.

As described in more detail below, while both sections 302 and 304 include data associated with the same profile owner (e.g., Robert S.), the data displayed in profile data section 302 is provided by and is owned by the profile owner (e.g., Robert S.), and the data displayed in contact data section 304 is provided by and is owned by the target user (e.g., Tim U.). For example, view 300 would be displayed in a device (e.g., computer, mobile phone number, tablet, etc.) of the target user (e.g., user U1 of FIG. 1), via the account of the target user. In other words, system 102 populates profile data section 302 with the data from the account of the profile owner.

In some implementations, profile data section 302 includes multiple fields and corresponding labels. For example profile data section 302 includes name fields such as a name field 306 and a nickname field 308. Profile data section 302 also includes a location field 310 and phone number fields such as cell phone number field 312, work phone number field 314, and home phone number field 316. Profile data section 302 also includes one or more email address fields such as email address field 318. In some implementations, profile data section 302 also may include a photo 320 of the profile owner (e.g., user U2 of FIG. 1).

In one example implementation, contact data section 304 includes similar fields and corresponding labels to those of the profile data section 302. For example, contact data section 304 may also include a photo 322 of the profile owner (e.g., user U2 of FIG. 1). In some implementations, photo 322 may be different from photo 320 in profile data section 302, because system 102 enables the target user to provide photo 322. The target user could be user U1 of FIG. 1, for example. Contact data section 304 may also include name fields such as a name field 326 and a nick name field 328. Contact data section 304 also includes a location field 330 and phone number fields such as cell phone number field 332, work phone number field 334, and home phone number field 336. Contact data section 304 also includes one or more email address fields such as email address field 338.

In some implementations, any field that is empty may be optionally hidden from view. For example, home phone number field 316 in section 302 is empty. While shown in FIG. 3, home phone number field 316 could be optionally hidden from view.

For ease of illustration, a particular number of fields are shown in FIG. 3. In some implementations, any number of fields may exist, and other types of fields may be included. For example, profile data section 302 and a contact data section 304 may include fields associated with employment data (e.g., employer, position, etc.), websites (e.g., work website, personal website, etc.), etc. Also, the fields may be arranged in any order, depending on the particular implementation.

Figure 4:
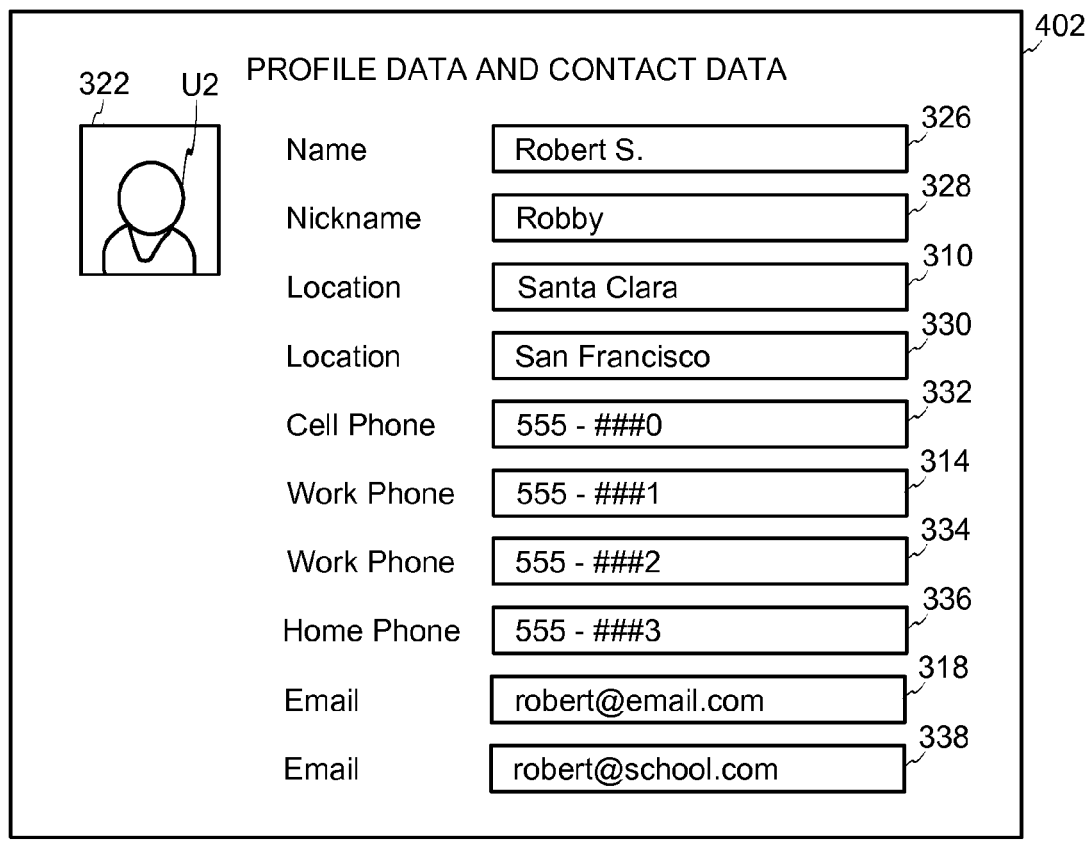
FIG. 4 illustrates an example simplified view in a GUI, according to some implementations.

FIG. 4 illustrates an example simplified view 400 in a GUI, according to some implementations. As shown, in some implementations, system 102 causes the profile data and the contact data to be interleaved in the same view 400. As such, view 400 may be referred to as interleaved view 400. In some implementations, in the interleaved view, system 102 may group profile data and contact data by field type. For example, system 102 may group phone number data together, because the phone number data is of the same type. System 102 may group address data together, because the address data is of the same type, etc.

In some implementations, view 400 includes one section, which may be referred to as an interleaved section 402, which includes both profile data and contact data. In one implementation, interleaved section 402 may include a photo 322 of the profile owner (e.g., user U2 of FIG. 1). Interleaved section 402 includes the same fields and corresponding labels as those of profile data section 302 and contact data section 304 of FIG. 3. For ease of illustration, the reference numbers for the fields shown in FIG. 3 correspond to reference numbers for like fields shown in FIG. 4. For example, interleaved section 402 includes name fields such as a name field 326 and a nick name field 328. Interleaved section 402 also includes location fields 310 and 330 and phone number fields such as cell phone number field 332, work phone number fields 314 and 334, and home phone number field 336. Interleaved section 402 also includes email address fields such as email address fields 318 and 338.

In various implementations, system 102 may include or exclude data from interleaved section 402 of FIG. 4 based on one or more policies. For example, as shown in FIG. 4, system 102 interleaves like fields from profile data section 302 and contact data section 304 of the first view 300 (FIG. 3) in interleaved section 402 of the second/interleaved view 400 (FIG. 4), where the data in those like fields differ. For example, because the data (e.g., Santa Clara) in location field 310 in profile data section 302 and the data (e.g., San Francisco) in location field 330 in contact data section 304 are different in the first/separated view 300 (FIG. 3), system 102 displays the data in corresponding interleaved location fields 310 and 330 in the second/interleaved view 400 (FIG. 4). In another example, system 102 interleaves work phone number fields 314 and 334 in view 400, because the data in those like fields are different in view 300 of FIG. 3. In yet another example, system 102 interleaves email address fields 318 and 338 in view 400, because the data in those like fields are different in view 300 of FIG. 3. Because system 102 displays different data values for like fields, such fields may be referred to as multi-value fields.

In some implementations, if a particular field has data in one of sections 302 and 304 of the first/separated view 300 but not in the other section, system 102 displays data in corresponding field in interleaved section 402 of the second/interleaved view 400 (FIG. 4). For example, the data (e.g., 555-###3) is present in home phone number field 336 of contact data section 304, but is not present in home phone number field 316 of profile data section 302 (in FIG. 3). System 102 still shows the data (e.g., 555-###3) in a corresponding home phone number field 336 of interleaved section 402 (FIG. 4).

In some implementations, system 102 may merge data based on whether the data is associated with a single-value field or a multi-value field. In various implementations, a single-value field may be a field, where system 102 allows a single value per field type to be displayed. In various implementations, a multi-value field may be a field, where system 102 allows multiple values per field type to be displayed. Examples implementations involving single-value fields and multi-value fields are described below.

With regard to single-value fields, if the data in like fields of profile data section 302 and contact data section 304 are different (FIG. 3), system 102 may select the data from one of the fields to display in interleaved section 402 (FIG. 4). In other words, in various implementations, system 102 may selectively omit profile data from the second/interleaved view based on data field type. In some implementations, system 102 selects the data owned by the target user (e.g., from the field in contact data section 304). For example, while two different photos 320 and 322 are shown in view 300 (FIG. 3), system 102 may select photo 322 to represent the profile owner in interleaved view 400. In another example, as shown in FIG. 3, nickname field 308 shows "Rob," and nickname field 328 shows "Robby." In some implementations, system 102 may select the data (e.g., Robby) from one of the fields to display in interleaved section 402 of FIG. 4. The profile photo and nickname are examples of types of data that may be associated with a single-value field. Other types of data may be associated with single-value fields (e.g., name field, employer, position, etc.).

With regard to multi-value fields, in some implementations, system 102 may merge duplicate data from like fields of profile data section 302 and contact data section 304 of the first/separated view 300 (FIG. 3) into one field of interleaved section 402 of the second/interleaved view 400 (FIG. 4). For example, because the data (e.g., 555-###0) in cell phone field 312 in profile data section 302 and in cell phone field 332 in contact data section 304 (FIG. 3) are the same, system 102 merges the data (e.g., 555-###0) into one cell phone field 332 in interleaved view 400 (FIG. 4).

In some implementations, system 102 causes attribution information to be displayed in interleaved view 400, where the attribution information indicates sources of the profile data and the contact data. In some implementations, system 102 may display particular icons next to each field to indicate attribution, where one icon may indicate the profile owner as the source/owner and where another icon may indicate the target user as the source/owner. In some implementations, where the profile owner has multiple profiles (e.g., a personal profile and a work profile), system 102 may utilize different icons to indicate whether data in a particular field is attributed to the personal profile or the work profile.

In some implementations, system 102 may enable the target user to navigate to the profile of the profile owner if the target user selects an icon that indicates the profile owner as the source. In some implementations, system 102 may color code the text of the data in the fields to indicate attribution, where one color may indicate the profile owner as the source and where another color may indicate the target user as the source. In some implementations, system 102 may alter the color of the text depending on the text over which the target user hovers the cursor. For example, if the target user hovers the cursor over the text representation of the data that the target user owns, system 102 may highlight or alter the color of all text representing data owned by the target user. If the target user hovers the cursor over text representing the data that the profile owner owns, system 102 may highlight or alter the color of all text representing data owned by the profile owner.

In various implementations, system 102 enables the target user to modify the contact data in any one of the views. In various implementations, system 102 enables the user to add, modify, and remove data owned by the target user (also referred to as contact data) in any of the views. For example, if a particular field is attributed to the target user, system 102 enables the target user to put a cursor in field and modify, remove data, or update the data. In response to the target user modifying the contact data, system 102 updates the contact data in each of the views. In some implementations, the profile data is read-only data with respect to the target user.

Implementations described herein may apply to data associated with multiple profiles of the profile owner. For example, the profile owner may have a work profile and a personal profile in the social network system. Accordingly, each of the multiple views, such as those described herein, may display data from the work profile and personal profile provided by the profile owner, in addition to displaying data from the contact data provided by the target user.

In various implementations, the profile data and contact data associated with a particular person may be linked by one or more types of data, where system 102 uses the linking data to retrieve relevant profile data and contact data from respective storage locations. For example, the profile data and contact data associated with a particular person may be linked by an email address. In another example, the profile data and contact data associated with a particular person may be linked by a phone number.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time.

While system 102 is described as performing the steps as described in the implementations herein, any suitable component or combination of components of system 102 or any suitable processor or processors associated with system 102 may perform the steps described.

Implementations described herein provide various benefits. For example, implementations enable a target user viewing another user's profile/contact information to toggle between different views of the profile/contact data. Implementations described herein also enable the target user to add, modify, and/or delete content data.

Figure 5:
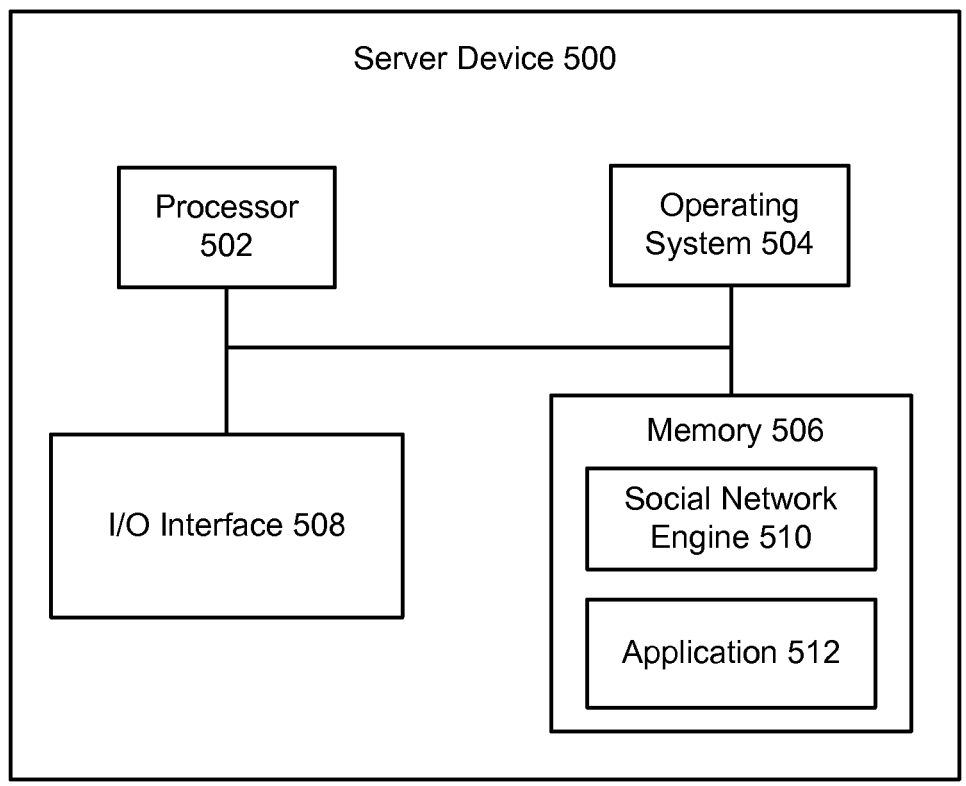
FIG. 5 illustrates a block diagram of an example server device, which may be used in implementations described herein.

FIG. 5 illustrates a block diagram of an example server device 500, which may be used in implementations described herein. For example, server device 500 may be used to implement server device 104 of FIG. 1, as well as to perform the method implementations described herein. In some implementations, server device 500 includes a processor 502, an operating system 504, a memory 506, and an input/output (I/O) interface 508. Server device 500 also includes a social network engine 510 and an application 512, which may be stored in memory 506 or on any other suitable storage location or computer-readable medium. Application 512 provides instructions that enable processor 502 to perform the functions described herein and other functions.

For ease of illustration, FIG. 5 shows one block for each of processor 502, operating system 504, memory 506, I/O interface 508, social network engine 510, and application 512. These blocks 502, 504, 506, 508, 510, and 512 may represent multiple processors, operating systems, memories, I/O interfaces, social network engines, and media applications. In some implementations, server device 500 may not have all of the components shown and/or may have other elements including other types of elements instead of, or in addition to, those shown herein.

Although the description has been described with respect to particular implementations thereof, these particular implementations are merely illustrative, and not restrictive. Concepts illustrated in the examples may be applied to other examples and various implementations.

Note that the functional blocks, methods, devices, and systems described in the present disclosure may be integrated or divided into different combinations of systems, devices, and functional blocks as would be known to those skilled in the art.

Any suitable programming languages and programming techniques may be used to implement the routines of particular implementations. Different programming techniques may be employed such as procedural or object-oriented. The routines may execute on a single processing device or multiple processors. Although the steps, operations, or computations may be presented in a specific order, the order may be changed in different particular implementations. In some particular implementations, multiple steps shown as sequential in this specification may be performed at the same time.

A "processor" includes any suitable hardware and/or software system, mechanism or component that processes data, signals or other information. A processor may include a system with a general-purpose central processing unit, multiple processing units, dedicated circuitry for achieving functionality, or other systems. Processing need not be limited to a geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

What is claimed is:

1. A computer-implemented method comprising:
    receiving profile data associated with a profile owner, wherein the profile data is provided by the profile owner and is stored in a storage location;

receiving contact data associated with the profile owner, wherein the contact data is provided by a target user and is stored in the storage location;

determining linking information, wherein the linking information is an email address or a phone number;

enabling the profile data and contact data to be retrieved from the first storage location based on the linking information;

generating an interleaved view, and wherein the profile data and the contact data are displayed in an interleaved manner in a same section of the interleaved view;

generating a separated view, wherein the profile data and the contact data are displayed in different sections of the separated view;

providing the target user with an option to toggle between the interleaved view and the separated view; and enabling the target user to modify the contact data associated with the profile user.

2. The method of claim 1, wherein generating the interleaved view further comprises:

identifying that a field of the profile data section and the field of the contact data section include data that are different; and selecting the data owned by the target data and omitting the data owned by the profile owner for the field.

3. The method of claim 1, wherein the contact data is provided by the target user, wherein the method further comprises:

enabling the target user to modify the contact data in any one of the one or more views; and updating the contact data in each of the one or more views in response to the target user modifying the contact data.

4. The method of claim 1, wherein responsive to determining that an indicator associated with the target user is hovering over text associated with the profile data provided by the profile owner, performing at least one of a highlighting and a coloring of text associated with the profile data.

5. The method of claim 1, further comprising:

selectively omitting profile data from the interleaved view based on data field type.

6. The method of claim 1, further comprising:

merging duplicate data from the profile data and the contact data in the interleaved view.

7. The method of claim 1, further comprising:

causing attribution information to be displayed in the interleaved view, wherein the attribution information includes icons next to each field, and wherein the attribution information indicates sources of the profile data and the contact data; and enabling the target user to modify the contact data, wherein the profile data is read-only data with respect to the target user.

8. A computer-implemented method comprising:

receiving profile data associated with a profile owner, wherein the profile data is provided by the profile owner, the profile data is associated with multiple profiles of the profile owner, and the profile data is stored in a first storage location;

receiving contact data associated with the profile owner, wherein the contact data is provided by a target user and is stored in a second the storage location;

determining linking information, wherein the linking information is an email address or a phone number;

enabling the profile data and contact data to be retrieved from the first storage location and the second storage location, respectively, based on the linking information;

generating a first view and a second view, wherein the profile data and the contact data are displayed in different sections of the first view, and wherein the profile data and the contact data are displayed in a same section of the second view;

providing the target user with an option to toggle between the first view and the second view; and enabling the target user to modify the contact data associated with the profile user.

9. The method of claim 8, responsive to determining that an indicator associated with the target user is hovering over text associated with the profile data provided by the profile owner, performing at least one of a highlighting and a coloring of text associated with the profile data.

10. The method of claim 8, further comprising:

enabling the target user to modify the contact data in any one of the views; and updating the contact data in each of the first and second views in response to the target user modifying the contact data.

11. The method of claim 8, further comprising causing the profile data and the contact data to be interleaved in the second view.

12. The method of claim 8, further comprising merging duplicate data from the profile data and the contact data in the second view.

13. The method of claim 8, further comprising causing the profile data and the contact data to be interleaved in the second view; and causing attribution information to be displayed in the second view, wherein the attribution information indicates sources of the profile data and the contact data.

14. A system comprising:

one or more processors; and logic encoded in one or more tangible media for execution by the one or more processors and when executed operable to perform operations comprising:

receiving profile data associated with a profile owner, wherein the profile data is provided by the profile owner and is stored in a storage location;

receiving contact data associated with the profile owner, wherein the contact data is provided by a target user and is stored in the storage location;

determining linking information, wherein the linking information is an email address or a phone number;

enabling the profile data and contact data to be retrieved from the first storage location based on the linking information;

generating an interleaved view, and wherein the profile data and the contact data are displayed in an interleaved manner in a same section of the interleaved view;

generating a separated view, wherein the profile data and the contact data are displayed in different sections of the separated view;

providing the target user with an option to toggle between the interleaved view and the separated view; and enabling the target user to modify the contact data associated with the profile user.

15. The system of claim 14, wherein generating the interleaved view further comprises:

identifying that a field of the profile data section and the field of the contact data section are different and selecting the data owned by the target data and omitting the data owned by the profile owner for the field wherein the logic when executed is further operable to perform operations comprising enabling the target user to modify the contact data in any one of the one or more views.

16. The system of claim 14, wherein the contact data is provided by the target user, wherein the logic when executed is further operable to perform operations comprising:

enabling the target user to modify the contact data in any one of the one or more views; and updating the contact data in each of the one or more views in response to the target user modifying the contact data.

17. The system of claim 14, wherein responsive to determining that an indicator associated with the target user is hovering over text associated with the profile data provided by the profile owner, performing at least one of a highlighting and a coloring of text associated with the profile data.

18. The system of claim 14, wherein when generating the one or more views the logic when executed is further operable to perform operations comprising:

selectively omitting profile data from the interleaved view based on data field type.

19. The system of claim 14, wherein when generating the one or more views the logic when executed is further operable to perform operations comprising:

merging duplicate data from the profile data and the contact data in the interleaved view.

20. The system of claim 14, wherein the logic when executed is further operable to perform operations comprising causing attribution information to be displayed in the interleaved view, and wherein the attribution information indicates sources of the profile data and the contact data.

\* \* \* \* \*

UNITED STATES PATENT AND TRADEMARK OFFICE
CERTIFICATE OF CORRECTION

PATENT NO. : 9,471,682 B1
APPLICATION NO. : 13/597112
DATED : October 18, 2016
INVENTOR(S) : Fong et al.

It is certified that error appears in the above-identified patent and that said Letters Patent is hereby corrected as shown below:

In the Claims

Starting at Column 13, Line 1, Claim 15 please delete:
"identifying that a field of the profile data section and the field of the contact data section are different and selecting the data owned by the target data and omitting the data owned by the profile owner for the field wherein the logic when executed is further operable to perform operations comprising enabling the target user to modify the contact data in any one of the one or more views."
And insert:
-- identifying that a field of the profile data section and the field of the
contact data section are different; and
selecting the data owned by the target data and omitting the data owned
by the profile owner for the field
wherein the logic when executed is further operable to perform operations comprising enabling the target user to modify the contact data in any one of the one or more view. -- therefor.

Signed and Sealed this
Seventeenth Day of March, 2020

Andrei Iancu
*Director of the United States Patent and Trademark Office*